United States Patent
Lai et al.

(10) Patent No.: US 10,156,939 B2
(45) Date of Patent: Dec. 18, 2018

(54) LIGHT SOURCE ASSEMBLY OF OPTICAL TOUCH DEVICE

(71) Applicant: PixArt Imaging Inc., Hsinchu (TW)

(72) Inventors: Hung-Ching Lai, Hsinchu (TW);
Hui-Hsuan Chen, Hsinchu (TW);
Chi-Chieh Liao, Hsinchu (TW)

(73) Assignee: PixArt Imaging Inc., Hsin-chu (TW)

(*) Notice: Subject to any disclaimer, the term of this patent is extended or adjusted under 35 U.S.C. 154(b) by 56 days.

(21) Appl. No.: 15/297,097

(22) Filed: Oct. 18, 2016

(65) Prior Publication Data
US 2017/0038913 A1 Feb. 9, 2017

Related U.S. Application Data

(63) Continuation of application No. 13/473,582, filed on May 16, 2012.

(30) Foreign Application Priority Data

Dec. 19, 2011 (TW) .............................. 100147088 A

(51) Int. Cl.
*G06F 3/042* (2006.01)
*G02B 5/04* (2006.01)
*G06F 3/041* (2006.01)

(52) U.S. Cl.
CPC ........... *G06F 3/0428* (2013.01); *G02B 5/045* (2013.01); *G06F 3/0418* (2013.01); *G02B 5/04* (2013.01); *G06F 3/042* (2013.01); *G06F 3/0421* (2013.01)

(58) Field of Classification Search
CPC ...... G06F 3/0418; G06F 3/042; G06F 3/0421; G06F 3/0428; G02B 5/04
See application file for complete search history.

(56) References Cited

U.S. PATENT DOCUMENTS

| | | | | |
|---|---|---|---|---|
| 6,100,538 | A * | 8/2000 | Ogawa | G06F 3/03545 178/18.09 |
| 2006/0152931 | A1* | 7/2006 | Holman | F21S 8/08 362/297 |
| 2009/0141002 | A1* | 6/2009 | Sohn | G02F 1/13338 345/175 |
| 2011/0061950 | A1* | 3/2011 | Cheng | G06F 3/0428 178/18.09 |
| 2011/0102371 | A1* | 5/2011 | Chang | G06F 3/0421 345/175 |

(Continued)

*Primary Examiner* — Michael J Eurice
(74) *Attorney, Agent, or Firm* — Li-Jen Shen

(57) ABSTRACT

A light source assembly for an optical touch device includes a linear light source and a plurality of prism pillars. The linear light source includes a lighting surface having a first side along a first direction and a second side along a second direction for emitting light. The first side is longer than the second side, and the first direction intersects the second direction. The prism pillars are disposed adjacent to the lighting surface and arranged along the first direction. Each of the prism pillars includes a first surface adjacent to the lighting surface and two reflection surfaces tilted toward each other for reflecting the light. The first surface is connected to the two reflection surfaces and parallel to the lighting surface. Each of the first surfaces is for receiving the emitted light, and each of the first surfaces and one of the reflection surfaces form a first angle.

6 Claims, 6 Drawing Sheets

(56) References Cited

U.S. PATENT DOCUMENTS

2011/0157044 A1* 6/2011 Yu .................... G06F 3/0418
345/173
2013/0027352 A1* 1/2013 Holloway ............ G06F 3/0421
345/175

* cited by examiner

LIGHT SOURCE ASSEMBLY OF OPTICAL TOUCH DEVICE

This application is a continuation of and claims priority to U.S. patent application Ser. No. 13/473,582, filed May 16, 2012, the disclosure of which is incorporated in its entirely herein by reference thereto.

TECHNICAL FIELD

The present invention relates to a touch device, and more particularly to an optical touch device and a light source assembly thereof.

BACKGROUND

Touch function has become one of the essential features of many of today's electronic devices, and touch device is one of the common electronic devices capable of realizing the touch function. Basically, the present touch devices are categorized to: resistive type, capacitive type and optical type. Thus, various electronic devices can adopt various types of touch device based on different touch requirements.

FIG. 1 is a schematic structure view of a conventional optical touch device. As shown, the conventional optical touch device 100 includes a light guide set 110, a light emitting component 120 and a light sensing component 130. The light guide set 110 includes two light guide strips 112a, 112b and a strip mirror 114. The light guide strips 112a, 112b and the strip mirror 114 are arranged respectively along three of four sides of a rectangular trajectory; wherein the light guide strip 112a is configured to be opposite to the strip mirror 114, the light guide strips 112b is configured to be connected between the light guide strip 112a and the strip mirror 114, and the area within the rectangular trajectory is defined as a sensing area 116. In addition, the light emitting component 120 is disposed between the two adjacent ends of the light guide strips 112a, 112b and configured to provide lights to inside the light guide strips 112a, 112b. The light guide strips 112a, 112b each is configured to direct the lights from the light emitting component 120 to the sensing area 116. The light sensing component 130 is disposed near to one end of the light guide strip 112a and configured to have a field of view (FOV) of the entire sensing area 116.

The light sensing component 130 is configured to detect a light-blocking object in the sensing area 116 and determine the light-blocking object' position. As shown in FIG. 1, for example, a touch point (or, light-blocking object) A is located in the sensing area 116, and a corresponding mirroring point A1 is formed on the strip mirror 114. Accordingly, a dark point A2, derived from the touch point A, and a dark point A3, derived from the mirroring point A1, are generated. Through detecting the two dark points A2, A3, the light sensing component 130 can obtain the distances d1, d2. And thus, the position (or, coordinate) of the touch point A can be obtained from the distances d1, d2, some known parameters such as the length of the X-axis of the sensing area 116, the width of the Y-axis of the sensing area 116, and some known conditions such as the shortest distance from the touch point A to the strip mirror 114 being equal to the shortest distance from the mirroring point A1 to the strip mirror 114. The means for the calculation of a coordinate are apparent to those ordinarily skilled in the art; no any unnecessary detail will be given here.

However, the conventional optical touch device 100 may have a blind zone 150 which is located near the lower left corner of the sensing are 116; wherein the blind zone means a specific area, in which the touch point's coordinate is difficult to be accurately calculated. For example, as shown in FIG. 1, a touch point B is located in the blind zone 150 of the sensing area 116 and a corresponding mirroring point B1 is formed on the strip mirror 114. Accordingly, the dark point B2, derived from the touch point B, and a dark point B3, derived from the mirroring point B1, may overlap; so, the coordinate of the touch point B is difficult to be calculated accurately.

SUMMARY OF EMBODIMENTS

Therefore, one object of the present invention is to provide an optical touch device to avoid the blind zone issue.

Another object of the present invention is to provide a light source assembly adopted in an optical touch device to solve the blind zone issue.

Still another object of the present invention is to provide a light source assembly adopted in an optical touch device to solve the blind zone issue.

The present invention provides a light source assembly for an optical touch device. The light source assembly includes a linear light source and a plurality of prism pillars. The linear light source includes a lighting surface having a first side along a first direction and a second side along a second direction for emitting light. The first side is longer than the second side, and the first direction intersects the second direction. The plurality of prism pillars are disposed adjacent to the lighting surface and arranged along the first direction. Each of the prism pillars includes a first surface adjacent to the lighting surface and two reflection surfaces tilted toward each other for reflecting the light. The first surface is connected to the two reflection surfaces and parallel to the lighting surface. Each of the first surfaces is used for receiving the light emitted by the lighting surface, and each of the first surfaces and one of the reflection surfaces form a first angle.

In an embodiment of the present invention, the two adjacent prism pillars are connected to each other.

In an embodiment of the present invention, the light source assembly further includes a plurality of second surfaces. Each of the second surfaces is disposed between the two adjacent prism pillars parallel to the lighting surface, and each of the second surfaces is used for receiving the light emitted by the lighting surface.

In an embodiment of the present invention, each of the prism pillars has a first reflection surface and a second reflection surface adjacent to the first reflection surface. The prism pillars include a first prism pillar and a second prism pillar adjacent to the first prism pillar. The first reflection surface of the first prism pillar is opposite to the second reflection surface of the second prism pillar, so that light incident the first reflection surface in the first direction is reflected by the first reflection surface and the second reflection surface and leaves the second reflection surface in a direction away from the first direction.

The present invention also provides another light source assembly of an optical touch device. The light source assembly includes a linear light source, a plurality of prism pillars and a plurality of first surfaces. The linear light source includes a lighting surface having a first side along a first direction and a second side along a second direction for emitting light. The first side is longer than the second side, and the first direction intersects the second direction. The plurality of prism pillars are disposed adjacent to the lighting surface and arranged along the first direction. Each of the prism pillars includes two reflection surfaces tilted toward each other for reflecting the light. Each of the plurality of first surfaces is disposed between the two adjacent prism pillars parallel to the lighting surface. Each of the first surfaces is used for receiving the light emitted by the lighting surface, and each of the first surfaces and one of the reflection surfaces form a first angle.

In an embodiment of the present invention, each of the prism pillars has a first reflection surface and a second reflection surface adjacent to the first reflection surface. The prism pillars include a first prism pillar and a second prism pillar adjacent to the first prism pillar. The first reflection surface of the first prism pillar is opposite to the second reflection surface of the second prism pillar, so that light incident the first reflection surface in the first direction is reflected by the first reflection surface and the second reflection surface and leaves the second reflection surface in a direction away from the first direction.

In summary, the optical touch device according to the embodiments of the present invention is implemented with a conventional optical touch device and a light source assembly, which is constituted by a light penetration and reflection component and an extra linear light source; wherein the linear light source is disposed opposite to the light penetration and reflection component and configured to enhance light source. According to the aforementioned structure, the optical touch device of the present invention can calculate the position coordinate of a touch point (or, a light-blocking object) more accurately so as to solve the blind zone issue. Thus, the optical touch device adopting the light source assembly of the present embodiment avoids the blind zone issue occurring in the conventional optical touch device, and the objects of the developments of the present invention are realized.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 2:
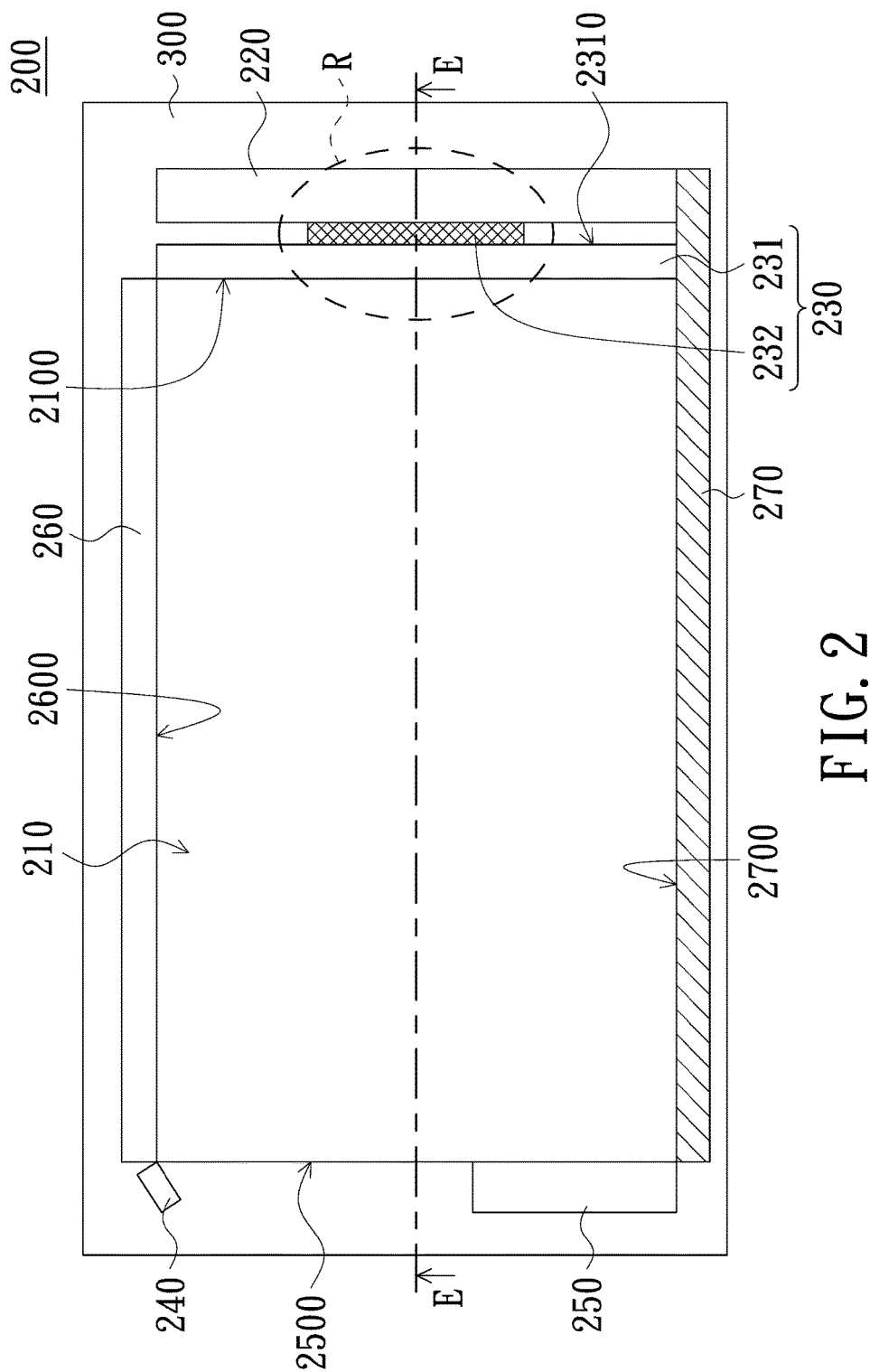
FIG. 2 is a schematic structure view of an optical touch device in accordance with a first embodiment of the present invention.

FIG. 2 is a schematic structure view of an optical touch device in accordance with a first embodiment of the present invention. As shown, the optical touch device 200 includes a sensing area 210, a linear light source 220, a light penetration and reflection component 230 and a light sensing component 240. The linear light source 220 is disposed next to a first side 2100 of the sensing area 210. The light penetration and reflection component 230 is disposed between the linear light source 220 and the first side 2100 of the sensing area 210. The light sensing component 240 is configured to have a field of view (FOV) of entire/or most of the sensing area 210.

Figure 3A:
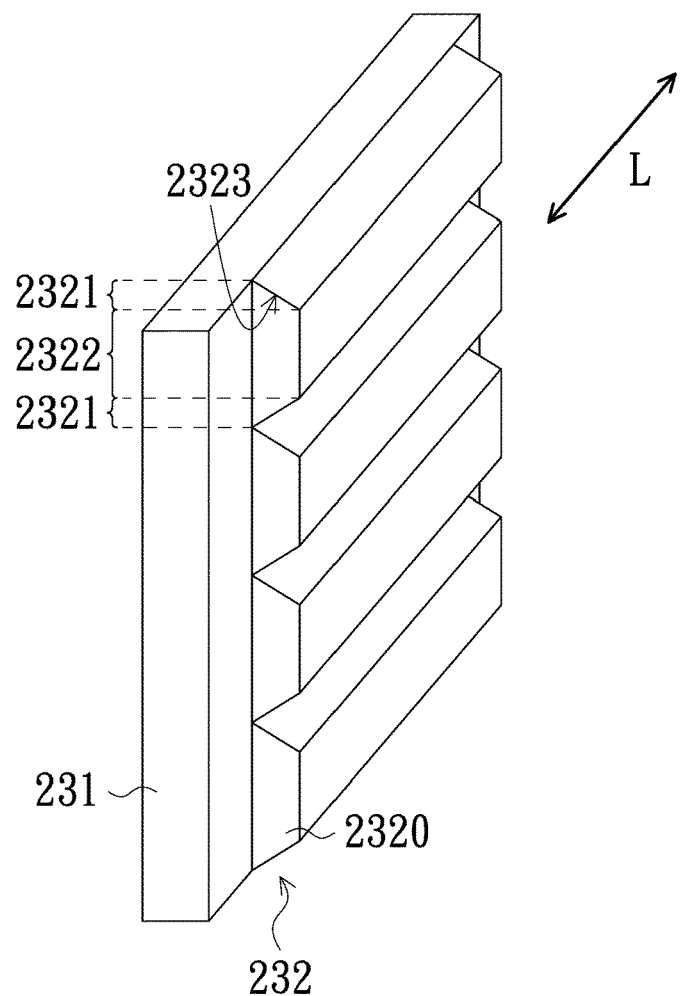
FIG. 3A is a schematic partial three-dimensional view in a region R of the light penetration and reflection component shown in FIG. 2.

FIG. 3A is a schematic partial three-dimensional view in a region R of the light penetration and reflection component 230 shown in FIG. 2. Please refer to FIGS. 2, 3A. The light penetration and reflection component 230 includes a substrate 231 and a light penetration and reflection structure 232 disposed on the substrate 231. The light penetration and reflection structure 232 includes a plurality of prism pillars 2320, each protrudes from a surface 2310 (shown in FIG. 2) of the substrate 231 and configured to be opposite to the linear light source 220. The light penetration and reflection structure 232 includes a plurality of reflection regions 2321 and a plurality of light penetration regions 2322. Each prism pillar 2320 is configured to have a length direction L parallel to the first side 2100 of the sensing area 210. Each prism pillar 2320 has at least one reflection surface 2323, and these reflection surfaces 2323 are includes in the reflection regions 2321 of the prism pillars 2320. The structure of the optical touch device 200 is further described in detail in the following.

Please refer back to FIG. 2. The optical touch device 200 further includes linear light sources 250, 260 and a mirror 270. The linear light source 250 is disposed next to a second side 2500 of the sensing area 210; wherein the second side 2500 is configured to be opposite to the first side 2100. The linear light source 260 is disposed next to a third side 2600 of the sensing area 210; wherein the third side 2600 is configured to be connected between the first side 2100 and the second side 2500. The light sensing component 240 is disposed in a connection area of the second side 2500 and the third side 2600. The mirror 270 is disposed next to a fourth side 2700 of the sensing area 210; wherein the fourth side 2700 is configured to be opposite to the third side 2600. In the embodiment of the optical touch device 200, the linear light sources 220, 260 are configured to emit lights at a same time point and the linear light source 250 is configured to emit lights at another time point. Specifically, the linear light source 250 and the linear light source 220, 260 are configured to emit lights alternately. However, it is to be noted that the present invention does not limit the emission mode (or, the emission sequence) of the linear light source 220, 250 and 260. In addition, the light penetration and reflection structure 232 is, for example, formed in a central area of the surface 2310 of the substrate 231.

Figure 3B:
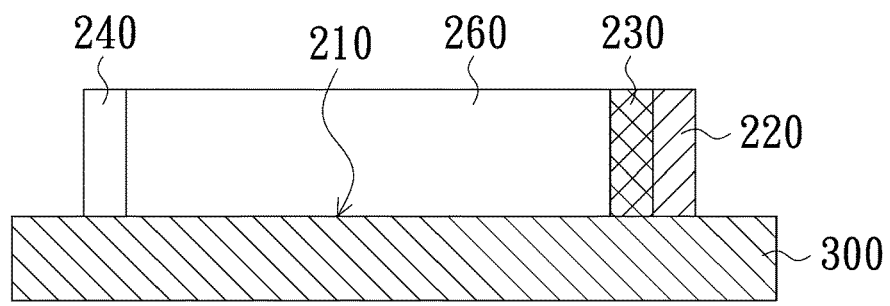
FIG. 3B is a schematic cross-sectional view of the optical touch device along a line E-E in FIG. 2.

FIG. 3B is a schematic cross-sectional view of the optical touch device 200 along a line E-E in FIG. 2. As shown in FIGS. 2, 3B, the sensing area 210 is an area on a plate 300 and surrounded by the linear light sources 220, 250 and 260, the light penetration and reflection component 230, the mirror 270 and the light sensing component 240. In another embodiment, a display panel (not shown) is disposed on the plate 300 and on which the sensing area 210 is disposed.

Figure 1:
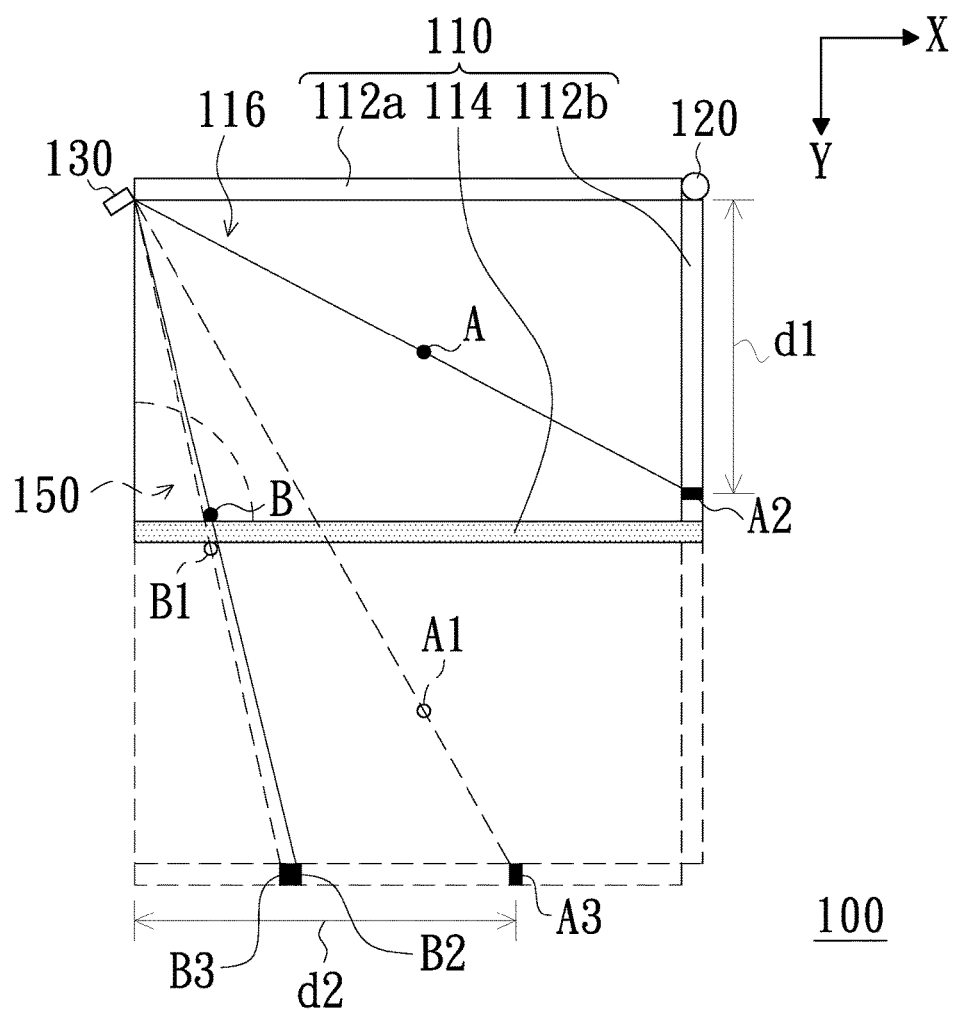
FIG. 1 is a schematic structure view of a conventional optical touch device.
Figure 4:
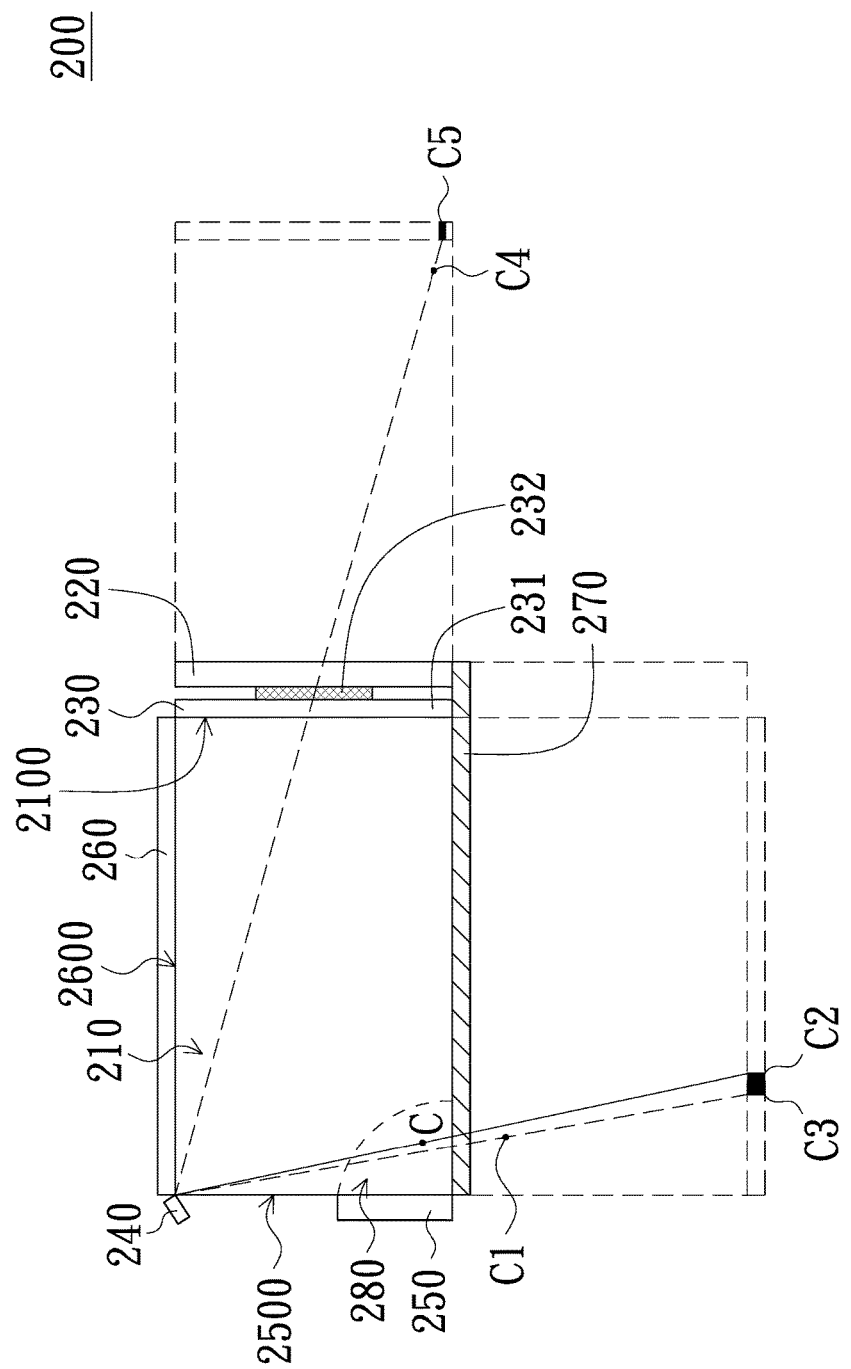
FIG. 4 is a schematic view illustrating that the sensing area having a light-blocking object located thereon.
Figure 5:
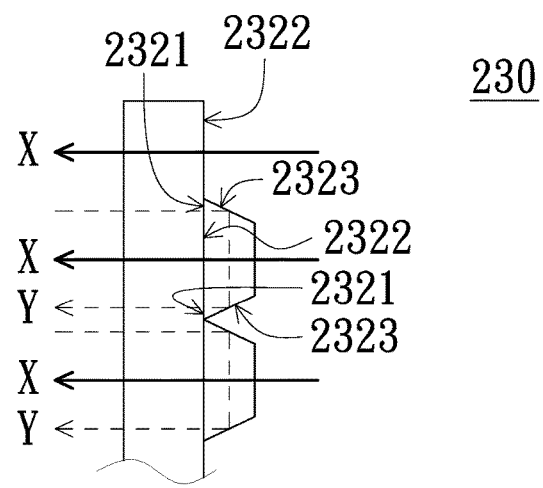
FIG. 5 is a schematic view illustrating light penetration paths and reflection paths associated with a light penetration and reflection component.

FIG. 4 is a schematic view illustrating that the sensing area 210 having a light-blocking object located thereon. FIG. 5 is a schematic view illustrating light penetration paths and reflection paths associated with the light penetration and reflection component 230. It is to be noted that the components/devices illustrated in FIG. 4 are similar to that in FIG. 2, so no any unnecessary detail will be given here. In addition, to prevent the blind zone issue, the optical touch device 200 of the present embodiment further includes the light penetration and reflection component 230 and an extra linear light source (for example, the linear light source 250), compared with the conventional optical touch device 100 shown in FIG. 1; wherein the light penetration and reflection components 230 and the linear light source 250 are configured to be opposite to each other. Moreover, it is to be noted that even the light penetration and reflection components 230 is disposed between the linear light source 220 and the sensing area 210, the lights emitted from the linear light source 220 still can penetrate the light penetration and reflection components 230 through the light penetration regions 2322 thereof (as shown the light penetration paths designated by X in FIG. 5). A light-blocking object C is located in the light sensing area 210, and a corresponding mirroring point C1 is formed on the mirror 270. However, due to the light-blocking object C is located in the blind zone 280, the dark points C2, C3 (respectively derived from the light-blocking object C and the mirroring point C1) may partially overlap. Accordingly, the light sensing component 240 may obtain limited optical information from the overlapped dark points C2, C3. In the structure of the optical touch device 200, because the light penetration and reflection component 230 can also, due to the reflection regions 2321 thereof, function as a mirror, a mirroring point C4 is formed by the light penetration and reflection component 230 when the light-blocking object C is being emitted by the linear light source 250, and simultaneously the lights emitted from the linear light source 250 can be reflected to the light sensing component 240 by the reflection surfaces 2323 of the reflection regions 2321 of the light penetration and reflection component 230 (as shown the reflection paths designated by Y in FIG. 5). Therefore, the light sensing component 240 can further, besides the overlapped dark points C2, C3, obtain the optical information of the dark point C5 according to the lights reflected from the light penetration and reflection component 230. Thus, the light sensing component 240 can, according to the optical information associated with the dark points C2, C3 and C5 (herein, the dark points C2, C3 overlap and are counted as one dark point), calculate the position coordinate of the light-blocking object C on the sensing area 210 more accurately. The means for the calculation of the position coordinate are apparent to those ordinarily skilled in the art; no any unnecessary detail will be given here. In addition, the linear light source 250 in this embodiment as illustrated in FIG. 4 is specifically configured to enhance the lights emitting to the area 280; however, it is understood that the linear light source 250 can be configured to provide lights for the entire sensing area 210 (or, configured to have a structure opposite to the entire second side 2500 of the sensing area 210). Based on the same manner, the light penetration and reflection structure 232 can be configured to have a structure opposite to the entire first side 2100 of the sensing area 210.

The light penetration and reflection structure according to the present invention may have some modulations; followings are the detailed descriptions of the light penetration and reflection structure structures according to various embodiments.

Figure 6:
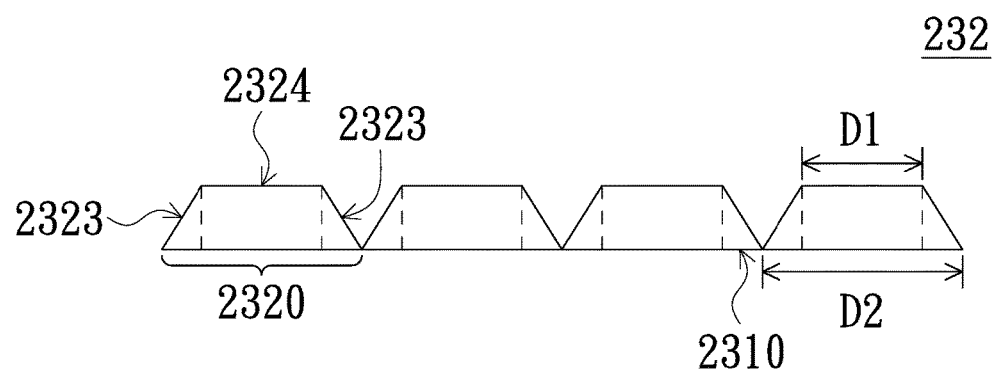
FIG. 6 is a schematic structure view of a light penetration and reflection structure in accordance with an embodiment of the present invention.

Please refer to FIG. 6, which is a schematic structure view of a light penetration and reflection structure in accordance with an embodiment of the present invention and for a detailed description of the light penetration and reflection structure 232 shown in FIG. 3A. As shown, the light penetration and reflection structure 232 includes a plurality of prism pillars 2320. Each prism pillar 2320 has two reflection surfaces 2323 and a light penetration portion 2324; wherein the two reflection surfaces 2323 are configured to tilt toward each other, and the light penetration portion 2324 is configured to be connected between the two reflection surfaces 2323. Each adjacent two prism pillars 2320 are configured to be connected to each other. These light penetration portions 2324 are included in the light penetration regions 2322 shown in FIG. 3A, and each light penetration portion 2324 has, for example, a flat or a curve structure. In particular, each light penetration portion 2324 is configured to have an orthogonal projection area D1 on the surface 2310 of the substrate 231, and each prism pillar 2320 is configured to have an area D2 on the surface 2310 of the substrate 231; wherein $1/20 \leq D1/D2 \leq 1/5$. It is understood that the aforementioned ratio value is only an example in this embodiment, and the ratio value can be modulated based on actual requirements in other embodiments. However, it is to be noted that, if D1/D2 is configured to be smaller than $1/20$, the penetrated lights may not be sufficient enough and thereby affecting the sensitivities of the light sensing component 240 detecting the dark points; alternatively, if D1/D2 is configured to be greater than $1/5$, the area of the reflection surfaces 2323 may be relatively small and thereby also affecting the sensitivities of the light sensing component 240 detecting the dark points.

Figure 7:
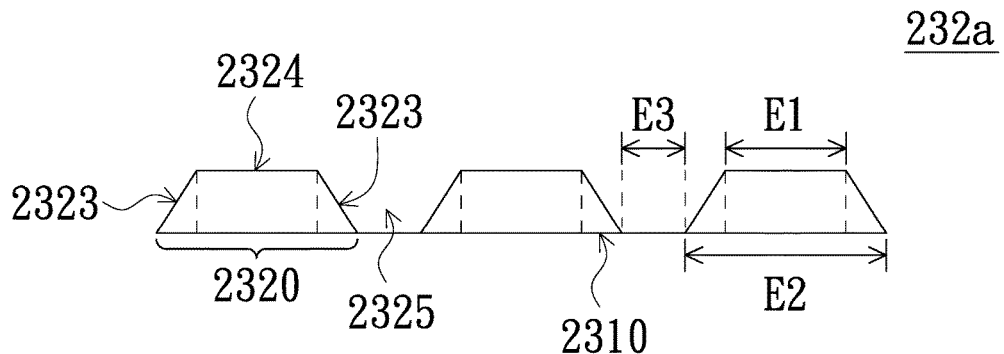
FIG. 7 is a schematic structure view of a light penetration and reflection structure in accordance with another embodiment of the present invention.

FIG. 7 is a schematic structure view of a light penetration and reflection structure in accordance with another embodiment of the present invention. As shown, the light penetration and reflection structure 232a includes a plurality of prism pillars 2320; wherein the prism pillars 2320 in FIG. 7 each has a structure same as the prism pillar 2320 (constituted by two reflection surfaces 2323 and one light penetration portion 2324) in FIG. 6 has. Specifically, each adjacent two prism pillars 2320 are configured to have a gap 2325 therebetween, and these gaps 2325 are included in the light penetration regions 2322 shown in FIG. 3A. In the light penetration and reflection structure 232a, each light penetration portion 2324 is configured to have an orthogonal projection area E1 on the surface 2310 of the substrate 231, each prism pillar 2320 is configured to have an area E2 on the surface 2310 of the substrate 231, and each gap 2325 is configured to have an area E3; wherein $1/20 \leq (E1+E3)/E2 \leq 1/5$.

It is understood that the aforementioned ratio value is only an example in this embodiment, and the ratio value can be modulated based on actual requirements in other embodiments. However, it is to be noted that, if (E1+E3)/E2 is configured to be smaller than $1/20$, the penetrated lights may not be sufficient enough and thereby affecting the sensitivities of the light sensing component 240 detecting the dark points; alternatively, if (E1+E3)/E2 is configured to be greater than 1/5, the area of the reflection surfaces 2323 may be relatively small and thereby also affecting the sensitivities of the light sensing component 240 detecting the dark points.

Figure 8:
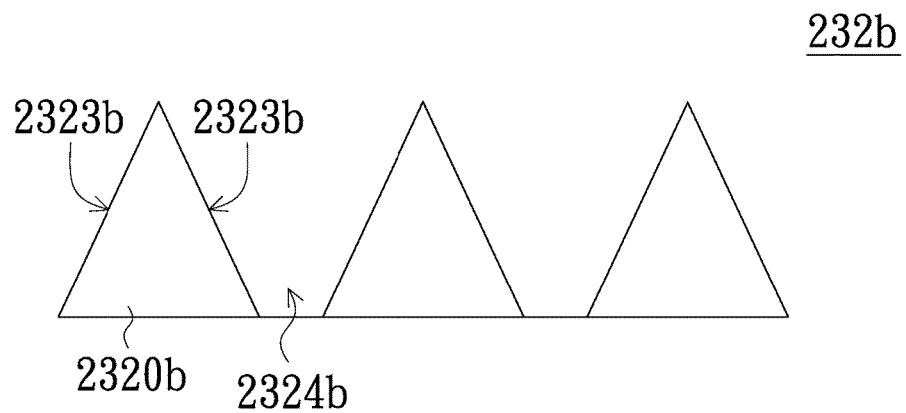
FIG. 8 is a schematic structure view of a light penetration and reflection structure in accordance with another embodiment of the present invention.

Please refer to FIG. 8, which is a schematic structure view of a light penetration and reflection structure in accordance with another embodiment of the present invention. As shown, the light penetration and reflection structure 232b includes a plurality of prism pillars 2320b. Each prism pillar 2320b has two reflection surfaces 2323b, which are configured to be connected and tilted toward each other. Each adjacent two prism pillars 2320b are configured to have a gap 2324b therebetween, and these gaps 2324b are included in the light penetration regions 2322 in FIG. 3A.

Figure 9:
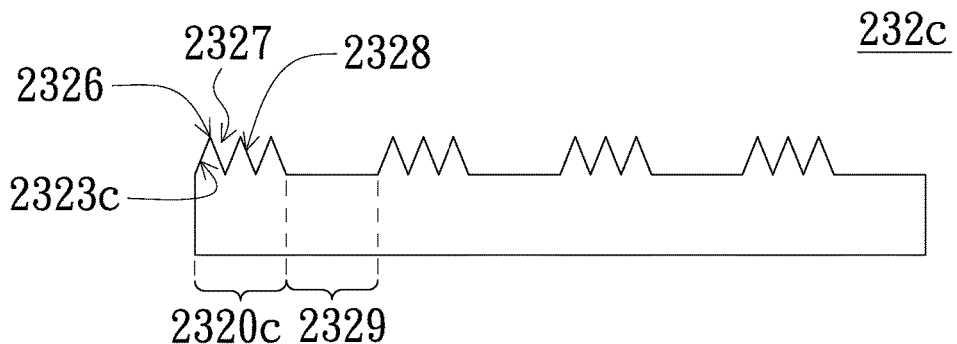
FIG. 9 is a schematic structure view of a light penetration and reflection structure in accordance with another embodiment of the present invention.

Please refer to FIG. 9, which is a schematic structure view of a light penetration and reflection structure in accordance with another embodiment of the present invention. As shown, the light penetration and reflection structure 232c includes a plurality of prism pillars 2320c. Each prism pillar 2320c has a plurality of V-shaped grooves 2327 on a top surface 2326 thereof; wherein the top surface 2326 is configured to be opposite to a linear light source (for example, the linear light source 220 in FIG. 2). Each V-shaped groove 2327 has two groove walls 2328. The groove walls 2328 associated with a same prism pillar 2320c are included in a reflection surface 2323c of the associated prism pillar 2320c. In addition, the light penetration and reflection structure 232c further includes a plurality of platforms 2329, each is configured to protrude from the surface 2310 of the substrate 231 opposite to the linear light source 200. The platforms 2329 and the prism pillars 2320c are arranged alternatively on the surface 2310. In addition, the platforms 2329 are included in the light penetration regions 2322 shown in FIG. 3A.

According to the aforementioned various light penetration and reflection structures disclosed in the embodiments illustrated in FIGS. 6, 7, 8 and 9, each light penetration and reflection structure includes a plurality of prism pillars; wherein the prism pillar herein is defined as an optical micro-structure. In the embodiments, each optical micro-structure includes a top portion, a bottom portion and at least one reflection surface; wherein the top portion is configured to be opposite to a linear light source (for example, the linear light source 220 in FIG. 2) and the reflection surface is configured to be connected to the top portion and the bottom portion. At least one of the top and bottom portions includes a flat region, and the reflection surface is configured to be tilted relative to the flat region. For example, in the embodiments illustrated in FIGS. 6, 7, the optical micro-structure (or, the prism pillar 2320) in the light penetration and reflection structures 232, 232a is a trapezoidal pillar structure and the top and bottom portions thereof both have a flat region. In the embodiment illustrated in FIG. 8, the optical micro-structure (or, the prism pillar 2320b) of the light penetration and reflection structure 232b is a triangle pillar structure and the bottom portion thereof has a flat region. In the embodiment illustrated in FIG. 9, the optical micro-structure (or, the prism pillar 2320c) of the light penetration and reflection structure 232c is a structure having a flat region on its bottom portion and a plurality of V-shaped grooves on its top portion; wherein the V-shaped grooves includes a plurality of groove walls, each serves as a reflection surface. In addition, the various light penetration and reflection structures disclosed in the aforementioned embodiments each is disposed between a linear light source (for example, the linear light source 220 in FIG. 2) and one side of a sensing area (for example, the sensing area 210 in FIG. 2); wherein the linear light source includes a light guide strip, and the prism pillars (or, the optical micro-structures) of the light penetration and reflection structure each is configured to have its top portion connected to the light guide strip.

In the aforementioned embodiments, the light penetration and reflection component 230 is exemplified by having the light penetration and reflection structures 232, 232a, 232b or 232c disposed on the substrate 231. In another embodiment, the light penetration and reflection component 230 may include the light penetration and reflection structure only without the substrate 231. It is to be noted that the light penetration and reflection component 230 without the substrate 231 still can provide full functions as the light penetration and reflection component 230 with the substrate 231 does.

Moreover, the light penetration and reflection component 230 and the linear light source 220 in the embodiments can be referred to as a light source assembly.

In summary, the optical touch device according to the embodiments of the present invention is implemented with a conventional optical touch device and a light source assembly, which is constituted by a light penetration and reflection component and an extra linear light source; wherein the linear light source is disposed opposite to the light penetration and reflection component and configured to enhance light source. According to the aforementioned structure, the optical touch device of the present invention can calculate the position coordinate of a touch point (or, a light-blocking object) more accurately so as to solve the blind zone issue. Thus, the optical touch device adopting the light source assembly of the present embodiment avoids the blind zone issue occurring in the conventional optical touch device, and the objects of the developments of the present invention are realized.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light source assembly for an optical touch device, comprising:
   a linear light source comprising a lighting surface having a first side along a first direction and a second side along a second direction for emitting light, wherein the first side is longer than the second side, and the first direction intersects the second direction; and
   a plurality of prism pillars disposed adjacent to the lighting surface and arranged along the first direction, wherein each of the prism pillars comprises a first surface adjacent to the lighting surface and two reflection surfaces tilted toward each other for reflecting the light, and the first surface is connected to the two reflection surfaces and parallel to the lighting surface, each of the first surfaces is used for receiving the light emitted by the lighting surface, each of the first surfaces and one of the reflection surfaces form a first angle, and the first surface is a flat surface.

2. The light; source assembly according to c wherein the two adjacent prism pillars are connected to each other.

3. The light source assembly according to claim 1, further comprising a plurality of second surfaces, wherein each of the second surfaces is disposed between the two adjacent prism pillars parallel to the lighting surface, and each of the second surfaces is used for receiving the light emitted by the lighting surface.

4. The light source assembly according to claim 1, wherein each of the prism pillars has a first reflection surface and a second reflection surface adjacent to the first reflection surface, the prism pillars comprise a first prism pillar and a second prism pillar adjacent to the first prism pillar, the first reflection surface of the first prism pillar is opposite to the second reflection surface of the second prism pillar, so that light incident the first reflection surface in the first direction is reflected by the first reflection surface and the second reflection surface and leaves the second reflection surface in a direction away from the first direction.

5. A light source assembly for an optical touch device, comprising:
   a linear light source comprising a lighting surface having a first side along a first direction and a second side along a second direction for emitting light, wherein the first side is longer than the second side, and the first direction intersects the second direction;
   a plurality of prism pillars disposed adjacent to the lighting surface and arranged along the first direction, wherein each of the prism pillars comprises two reflection surfaces tilted toward each other for reflecting the light; and
   a plurality of first surfaces, wherein each of the first surfaces is disposed between the two adjacent prism pillars parallel to the lighting surface, each of the first surfaces is used for receiving the light emitted by the lighting surface, each of the first surfaces and one of the reflection surfaces form a first angle, and the first surface is a flat surface.

6. The light source assembly according to claim 5, wherein each of the prism pillars has a first reflection surface and a second reflection surface adjacent to the first reflection surface, the prism pillars comprise a first prism pillar and a second prism pillar adjacent to the first prism pillar, the first reflection surface of the first prism pillar is opposite to the second reflection surface of the second prism pillar, so that light incident the first reflection surface in the first direction is reflected by the first reflection surface and the second reflection surface and leaves the second reflection surface in a direction away from the first direction.

* * * * *